(No Model.)
T. SMITH.
FIFTH WHEEL FOR VEHICLES.
No. 314,068. Patented Mar. 17, 1885.
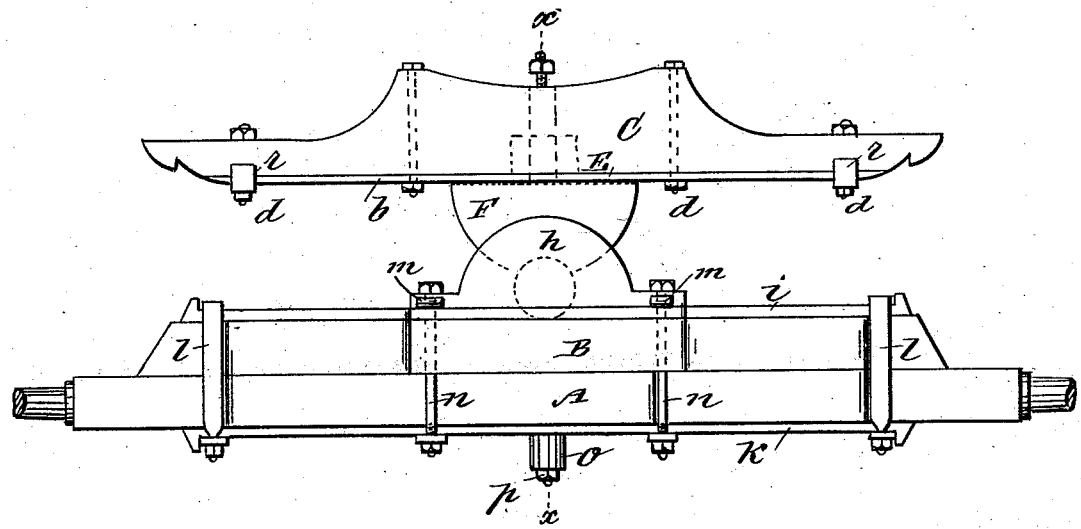
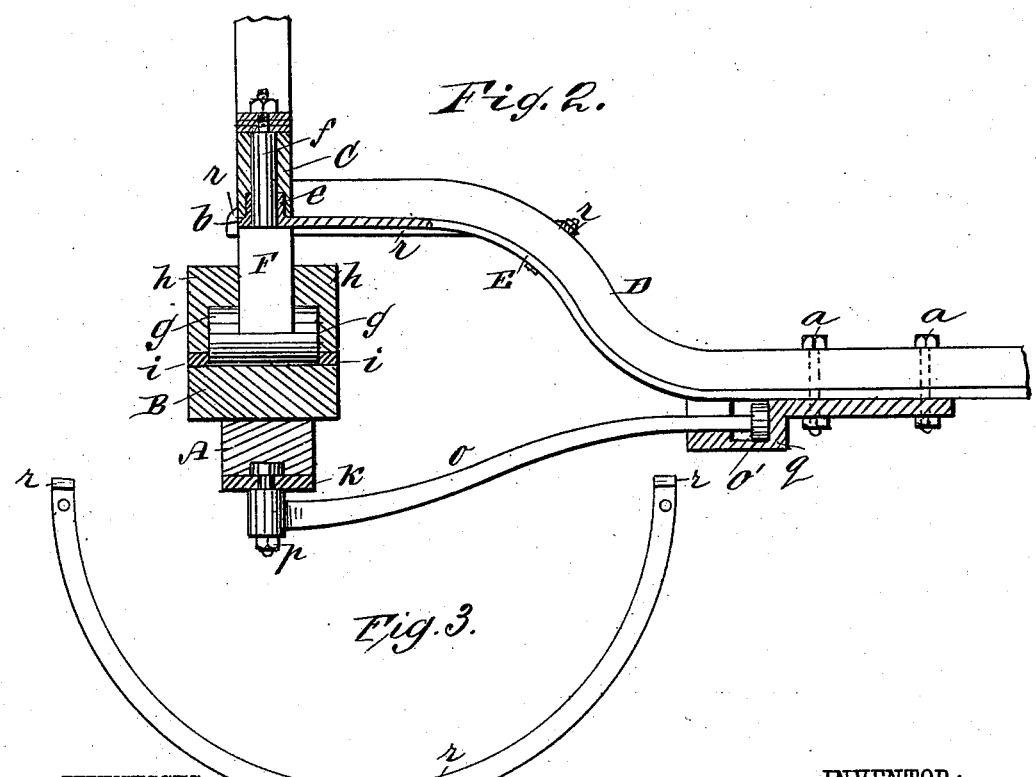
WITNESSES:
INVENTOR:
T. Smith
BY Munn & Co.
ATTORNEYS.

United States Patent Office.

THOMAS SMITH, OF BRECKENRIDGE, MISSOURI.

FIFTH-WHEEL FOR VEHICLES.

SPECIFICATION forming part of Letters Patent No. 314,068, dated March 17, 1885.

Application filed June 25, 1884. (No model.)

*To all whom it may concern:*

Be it known that I, THOMAS SMITH, of Breckenridge, in the county of Caldwell and State of Missouri, have invented a new and Improved Running-Gear for Vehicles, of which the following is a full, clear, and exact description.

My improvements relate to the axle-couplings of buggies and other vehicles, and have the object to give flexibility to the connections between the head-block and axle, so as to render the vehicle more easy riding and relieve strain on the gearing in passing over rough or uneven ground.

The invention consists in the novel construction and combination of parts hereinafter described and claimed.

Reference is to be had to the accompanying drawings, forming a part of this specification, in which similar letters of reference indicate corresponding parts in all the figures.

Figure 1 is a front elevation of a head-block, axle, and coupling, and Fig. 2 is a sectional side view of the same parts. Fig. 3 is a detailed plan view of the brace-plate $r$.

A is the axle; B, the axle-bed; C, the head-block, and D the reach.

E is a perch-plate attached to the reach by bolts at $a$, and formed with a T end, $b$, that is attached to the under side of the head-block by bolts $d$, and also made with a tubular boss, $e$, that is recessed into the head-block.

F is a coupling-piece of semicircular shape, formed with the king-bolt $f$, to permit horizontal movement of the axle, and with side ears or trunnions, $g\ g$.

$h\ h$ are boxes bolted to the bed and axle, so as to receive the coupling F between them, and recessed to receive the ears $g$.

Upon the axle-bed B is a plate, $i$, and on the under side of the axle is a plate, $k$, both plates $i\ k$ being clamped by clips $l\ l$ at the ends. These plates strengthen the bed and axle at their mid-length, where the weight is thrown by the coupling.

The two boxes $h$ are tied by bars $m\ m$ on the attaching-bolts $n$ and above plate $i$.

$o$ is a brace having an eye at one end taking on a bolt, $p$, that is attached to the axle, and extending back to a box, $q$, attached on the reach, which box is made with a T-groove or recess receiving the head $o'$ of the brace, so that the brace is allowed to move back and forth as the axle oscillates.

The head-block is braced by a plate, $r$, that is attached by its ends to the block C by the bolts $d$, and extends in curved form backward over the reach, to which it is attached. This brace $r$ also supports the coupling from strain when the axle rises high enough for the bed to strike the head-block. A straight brace from each side to the reach will answer the same purpose, and the reach may be either straight or curved and a double reach used, if desired.

This construction gives a flexibility to the coupling of the head on the axle-bed that relieves the box and gear from strain when the wheels pass over obstructions. The front wheels go over small obstructions without causing any jar or movement at the coupling, and the hind wheels as they rise rock the coupling-piece in the boxes, thereby easing the twist and strain. This renders the vehicle easy riding, and the parts are as firm and durable as the rigid connections generally used.

Rubber blocks may be inserted in the boxes to prevent noise.

Having thus described my invention, I claim as new and desire to secure by Letters Patent—

1. The piece F, formed with king-bolt $f$ and ears $g$, and the recessed boxes $h\ h$, combined with the head-block and axle-bed, substantially as described.

2. The combination, with the axle-bed and axle provided with boxes $h$, of the strengthening-plates $i\ k$, as shown and described.

3. The pivoted brace $o$, having head $o'$, and the box $q$, having a T-shaped recess, combined with reach D and axle A, hung to oscillate on the king-bolt connection, substantially as described.

THOMAS SMITH.

Witnesses:
JNO. F. SMITH,
JOHN T. GREGG.